United States Patent
Den Besten

(10) Patent No.: US 9,031,153 B2
(45) Date of Patent: May 12, 2015

(54) DUTY-CYCLE MODULATED TRANSMISSION

(75) Inventor: Gerrit Willem Den Besten, Eindhoven (NL)

(73) Assignee: NXP B.V., Eindhoven (NL)

( * ) Notice: Subject to any disclaimer, the term of this patent is extended or adjusted under 35 U.S.C. 154(b) by 787 days.

(21) Appl. No.: 12/742,291

(22) PCT Filed: Nov. 12, 2008

(86) PCT No.: PCT/IB2008/054735
§ 371 (c)(1),
(2), (4) Date: May 11, 2010

(87) PCT Pub. No.: WO2009/063410
PCT Pub. Date: May 22, 2009

(65) Prior Publication Data
US 2010/0260283 A1    Oct. 14, 2010

(30) Foreign Application Priority Data

Nov. 13, 2007   (EP) .................................. 07120578

(51) Int. Cl.
H04L 27/00      (2006.01)
H04L 25/49      (2006.01)

(52) U.S. Cl.
CPC .................................. H04L 25/4902 (2013.01)

(58) Field of Classification Search
None
See application file for complete search history.

(56) References Cited

U.S. PATENT DOCUMENTS

| 4,127,878 | A | 11/1978 | Johnson, Jr. et al. | |
|---|---|---|---|---|
| 4,694,504 | A | 9/1987 | Porter et al. | |
| 5,504,773 | A | * 4/1996 | Padovani et al. | 375/130 |
| 7,053,667 | B1 | 5/2006 | Tang | |
| 7,787,403 | B2 | 8/2010 | Winterton | |
| 2002/0167721 | A1 | * 11/2002 | Caplan | 359/347 |
| 2003/0215008 | A1 | * 11/2003 | Korotkov et al. | 375/238 |
| 2004/0233982 | A1 | * 11/2004 | Lee et al. | 375/238 |
| 2007/0116146 | A1 | * 5/2007 | Gudnason | 375/315 |
| 2010/0091921 | A1 | 4/2010 | Den Besten et al. | |

FOREIGN PATENT DOCUMENTS

| CN | 1412947 A | 4/2003 |
|---|---|---|
| DE | 43 07 834 A1 | 9/1994 |
| EP | 0 734 123 A2 | 9/1996 |
| KR | 10-2007-0086545 | 8/2007 |
| WO | 2006/043130 A1 | 4/2006 |
| WO | 2008/114205 A2 | 9/2008 |

OTHER PUBLICATIONS

International Search Report and Written Opinion for application PCT/IB2008/054735 (Jun. 3, 2009).

* cited by examiner

*Primary Examiner* — Shuwang Liu
*Assistant Examiner* — Gina McKie

(57) ABSTRACT

A duty-cycle modulated bit signalling method and circuit, comprising: signaling bits by virtue of a duty-cycle ratio; wherein the duty-cycle ratio is varied dependent upon the transmission rate of the signalling. A bit period comprises a long phase and a short phase and the duty-cycle therebetween is varied such that the ratio between the duration of the long phase and the duration of the short phase is increased for decreasing transmission rate. The duty-cycle ratio is varied dependent upon the transmission rate of the signalling according to one or more ranges of transmission rate. In a higher transmission rate range the duty-cycle is defined as a fixed ratio, and in a lower transmission range the duty-cycle is defined by a fixed length of the short phase of the bit period.

17 Claims, 8 Drawing Sheets

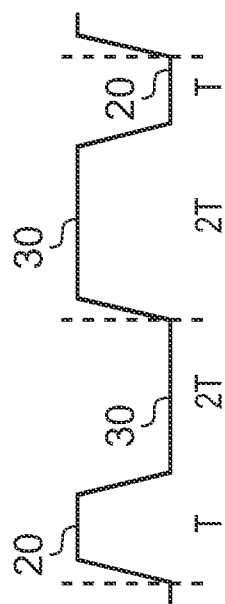
FIG. 3a
Fixed fraction
(bits are 3T long)
(at base rate)
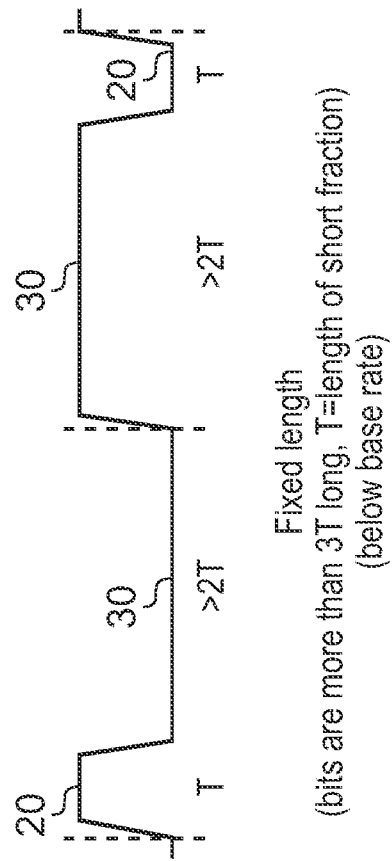
FIG. 3c
Fixed length
(bits are more than 3T long, T=length of short fraction)
(below base rate)
FIG. 3b
Fixed fraction
(bits are 3T long)
(at higher rate)

DUTY-CYCLE MODULATED TRANSMISSION

The present invention relates to duty-cycle modulation (DCM) bit-signalling.

A Duty-Cycle Modulation bit-signaling scheme, as shown in FIG. 1, has been described In European Patent Application 07104483.8, published as WO 2008/114205, and which is incorporated herein by reference. In a given bit period (3T in the FIG. 1 example) there is one short phase 20 and one long phase 30. In the example of FIG. 1 the duty-cycle between the duration of the long phase 30 and the duration of the short phase 20 is 2:1.

FIG. 2 depicts an example of fixed-rate fixed-ratio differential DCM transmission applying rising edge modulation, such that every bit starts with a negative polarity period. The bit stream explicitly contains the clock. In this example, the bit transmission is started from a static standby state with negative line polarity, by means of an intermediate wake-up period with positive line polarity to prepare for transmission.

As noted in the above-mentioned patent application, the duty cycle ratio can be chosen freely as long as high and low periods are clearly distinguishable. For high transmission speeds the ratio choice is driven towards ~50/~50 in order to make the short part of the period not shorter than necessary (assuming the detection can distinguish the difference in length easy enough). Simultaneously, the choice for the duty cycle ratio is pushed towards the other limit '~0/~100' in order to make the difference in duration between the two polarities within a bit period easily distinguishable (assuming the signals and circuits can switch fast enough and this is not a limiting factor).

A reasonable compromise between these aspects is a 33/67% ratio, which is not too far from 50/50% but the difference in length between the two signal polarities within a bit period is a factor 2. This is suitable ratio for all medium to high rates, but the present inventor has realised it becomes a problem if the rate becomes lower and lower, because the comparison/integration needs to be done over a very long period.

The present inventor has realised that distinguishing between duration of polarities within a bit-period becomes difficult if the length of each sub period becomes long. This holds especially if integrating receivers, which are described in the above-mentioned patent application, are intended to be used.

Integrating receivers do not need a separate clock signal, which makes the use of integrating receivers advantageous for many applications.

However, inside an integrating receiver the integrated signals will tend to clip if the integration period becomes very long, thereby losing its bit value information. Clipping can be avoided by adapting the integration current appropriately. This has also been described in the above-mentioned patent application to support a reasonable large range of higher data rates. But the present inventor has realised that if this is also exploited to allow very low data rates it becomes problematic as there will be very many sub-ranges needed to circumvent clipping and data loss.

For over-sampled receivers, which are also mentioned in the above-mentioned patent application, the clipping is less of a problem, but that kind of receiver requires availability and continuation of a clock signal. Furthermore, in order to make it power efficient, there will be reasons to reduce the sampling clock rate for low data rates, which tends to result in a similar sub-ranging problem.

The present inventor has realised that this tends to put a lower bound on the practical data rates using this signaling scheme.

According to the present invention, a duty-cycle ratio is made to depend on the actual data rate, such that detection is simplified. The present inventor has realised that in fact, for lower rates, the reason to keep the ratio close to 50/50% is not critical as there will be no short pulses anyway for data rates far below the maximum achievable rate as long as the duty-cycle does not approach 0/100%.

Many duty cycle adaptation methods according to the invention are possible.

Limiting the duration of the short-fraction of the bit period by a maximum absolute time period is beneficial as it limits the required comparison measure time for low frequencies.

One particularly interesting method, i.e. particularly advantageous aspect of the invention, is to use a fixed time length for the short-fraction of the bit period for data rates below a certain limit rate, while maintaining to use a fixed fraction of the period above that limit data rate, which means a scaling time duration (one example of an implementation of this is illustrated schematically in FIGS. 3a-c).

This corresponds with a fixed duty-cycle at higher rate and an increasing duty cycle ratio for decreasing data rates below the limit rate. If now, for example, the fixed time duration requirements match with the requirements of the short-fraction of the lowest range with the fixed duty-cycle, a smooth cross-over is obtained (as illustrated schematically in FIG. 4a).

In practical systems the minimum allowable pulse width might be determined by interconnect length, due to reflections. For example in case of MIPI Alliance specification for M-PHY the intended maximum interconnect length exceeds 1 meter with a signal flight time of several nanoseconds. This determines the base rate, which is the rate that is always supported under the specified system conditions. In case of M-PHY, this means the base rate must be below 20 Mb/s. As it is attractive to generate the DCM signals from the system clock which spans a significant frequency range (e.g. 19.2-52 MHz) so there are good reasons to allow a wide span of bit rates within any of the ranges. The base rates can, for example be chosen 6-18 Mb/s covering all these reference clock rates divided by 4a. Alternatively in order to have larger margins, 3-9 Mb/s can be chosen covering all clock rates divided by 6.

For this application, it is attractive to define the crossover point at the chosen base rate: anything including and beyond the base rate uses fixed duty cycle DCM. For any rate below the base range, the constraints of the base range for the short-fraction of the bit period are taken, while the long fraction fills up the rest of the period.

Note that the problem that has been addressed by this invention was primarily caused by the length of the shortest polarity fraction of the bit period, not by the length of the long fraction.

Aspects of the present invention will advantageously not require additional sub-ranges for lower frequencies for integrating receivers. In fact aspects of the present invention tend to imply that any lower rate will implicitly be supported by integrating receivers. Although an integrating receiver might clip on the long-fraction of the bit period, it will still be able to distinguish that it was longer than the fixed short-fraction and determine therefore the correctly the transmitted bit value.

Thereby the lower bound on bit rate and/or many rate sub-ranges are circumvented by aspects of the present invention.

In a first aspect, the present invention provides a duty-cycle modulated bit signalling method, comprising: signaling bits by virtue of a duty-cycle ratio; wherein the duty-cycle ratio is varied dependent upon the transmission rate of the signalling.

A bit period may comprise a short phase and a long phase and the duty-cycle between the long phase and the short phase may be varied such that the ratio between the duration of the long phase and the duration of the short phase is increased for decreasing transmission rate.

The duty-cycle ratio may be varied dependent upon the transmission rate of the signalling according to one or more ranges of transmission rate.

In at least one higher transmission rate range the duty-cycle may be defined as a fixed ratio, and in at least one lower transmission range the duty-cycle may be defined by a fixed length of the short phase of the bit period.

The method may further comprise a lower bound for the duration of the shortphase in the at least one lower transmission range.

The cross-over of the higher transmission rate range and the lower transmission rate range may be positioned at a rate such as to be always operable on a link with respect to signal flight times.

The method may further comprise pausing the transmission by fixing the line state during the long fraction of any bit.

The method may further comprise choosing the lane state during pausing.

The method may further comprise pausing the transmission by fixing the line state during the long fraction of a '1' bit.

The method may further comprise pausing the transmission by fixing the line state during the long fraction of a '0' bit.

The method may further comprise ensuring that for long pauses the lane state during a theses pause is always '0'.

The method may further comprise ensuring that for long pauses the lane state during a theses pause is always '1'.

The method may further comprise ensuring that for inter-packet pauses the lane state during a theses pause is always '0'.

The method may further comprise ensuring that for inter-packet pauses the lane state during a theses pause is always '1'.

In a further aspect, the present invention provides a circuit adapted to perform the method of any of the above aspects.

Further aspects of the present invention are as follows:

A Duty-Cycle Modulated bit signaling scheme in which the duty-cycle ratio is adapted to a transmission rate.

A Duty-Cycle Modulated bit signaling scheme in which the duty-cycle ratio is adapted for ranges of a transmission rate.

The Duty-Cycle Modulated bit signaling scheme in which the duty-cycle ratio is fixed for higher frequencies, while for lower-frequencies the duration of the short fraction of the bit period is bounded to a maximum.

The scheme may provide also with additionally a lower bound for the length of the short-fraction of the bit-period. The scheme wherein the cross-over of the two ranges where the time duration limitations and the duty-cycle limitation match are positioned at the rate which can always be operated on a link with respect to signal flight times.

A method to pause the transmission by fixing the line state during the long fraction of any bit. The method to pause the transmission may provide for ability to choose the lane state during the pausing.

Embodiments of the present invention will now be described, by way of example, with reference to the accompanying drawings, in which.

Figure 4A:
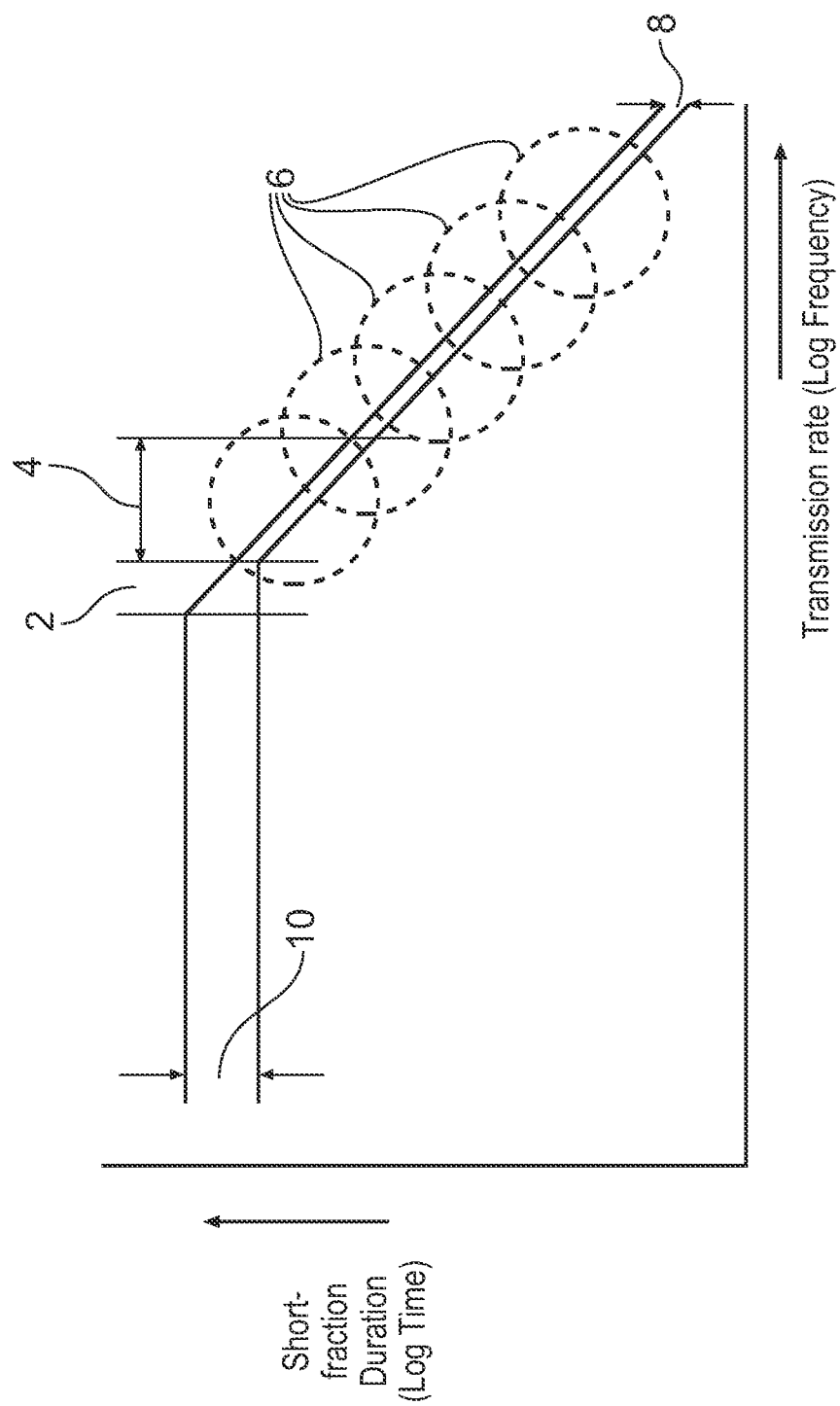
Figure 4B:
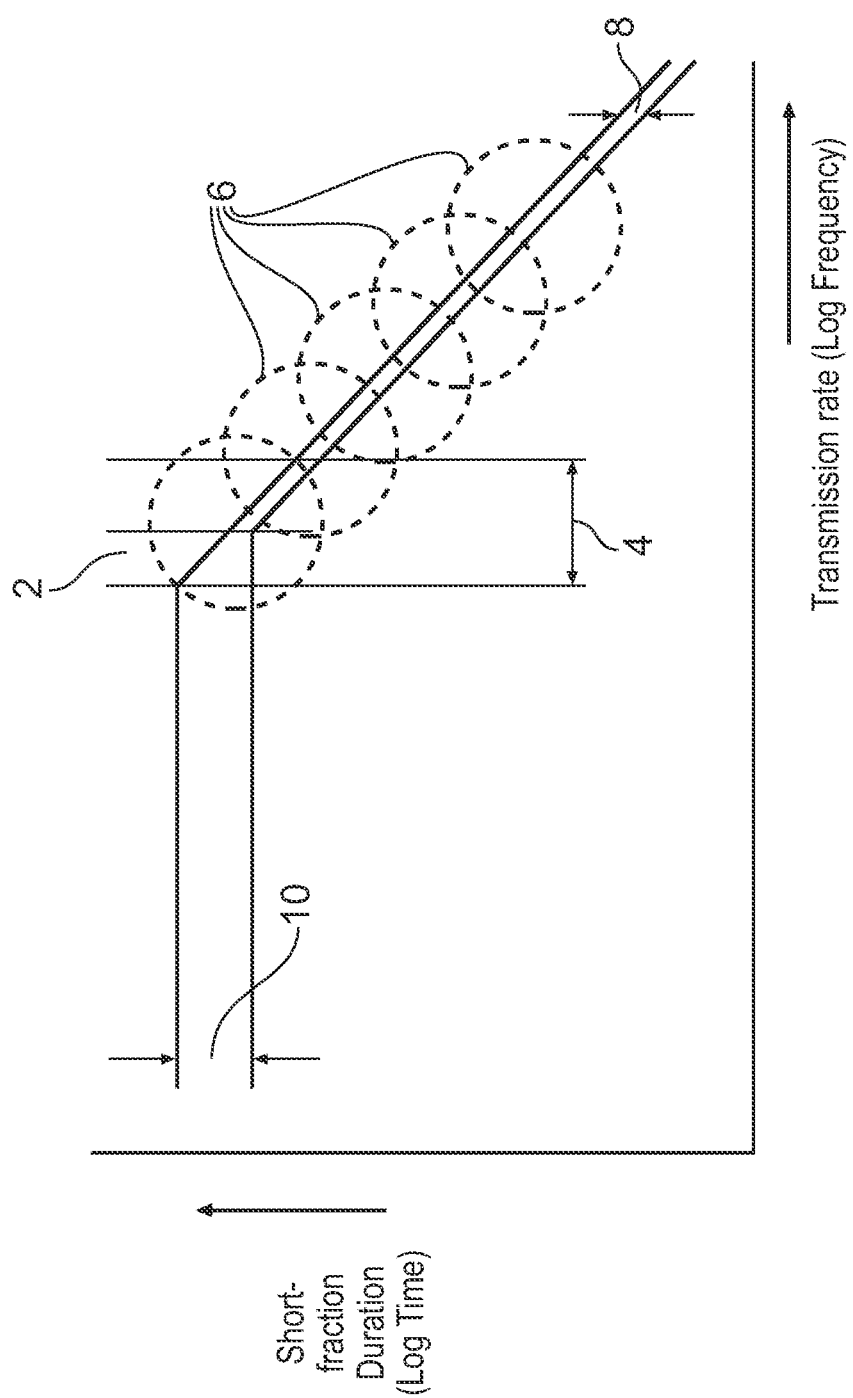
Figure 5:
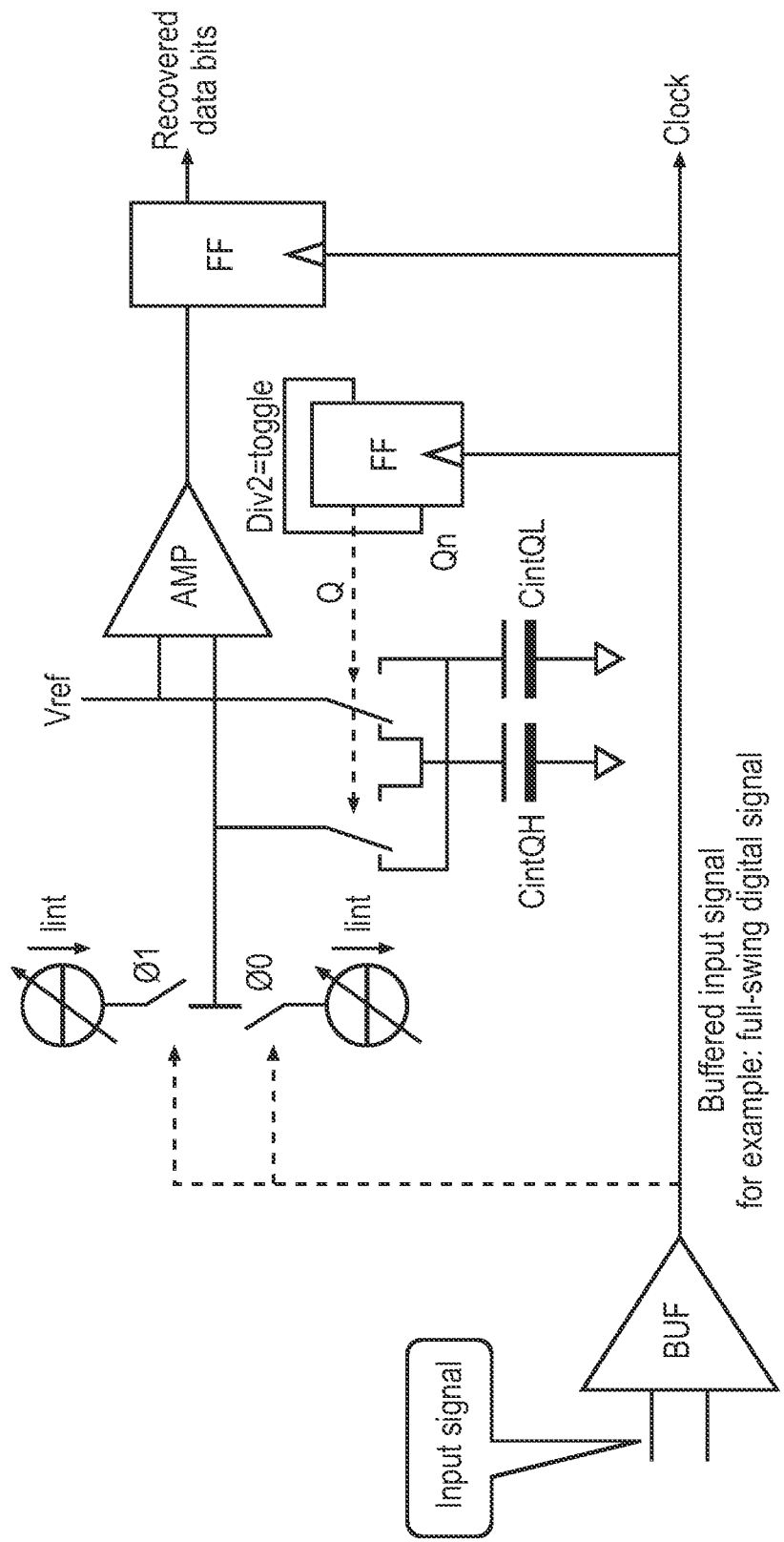
Figure 6:
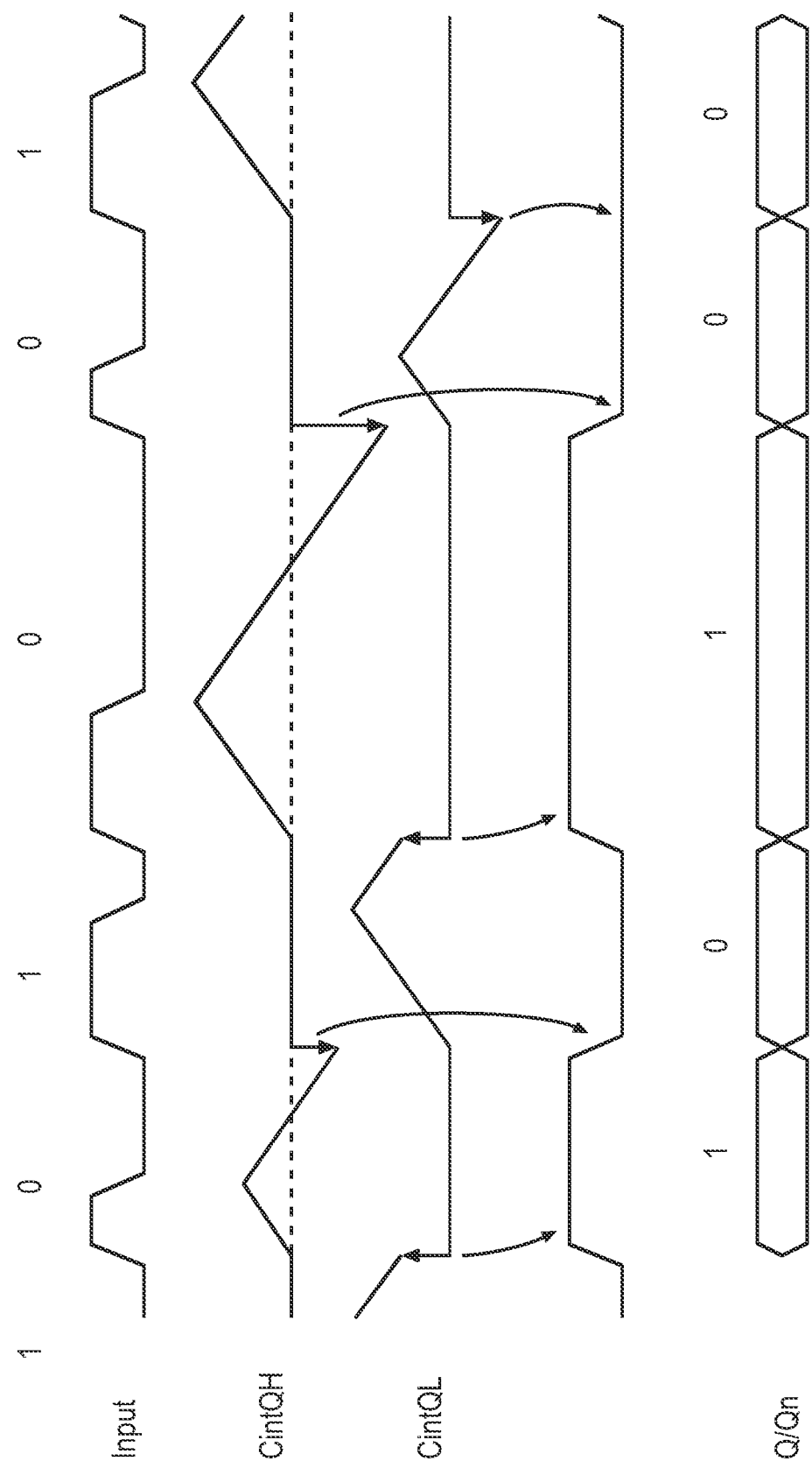

FIGS. 3a-c depict an example of DCM signalling with varying duty-cycles for different speed ranges;

FIGS. 4a-b depicts the relationship between transmission rate and the duration of the short fraction of a bit period, when applying fixed-ratio for higher data rates and fixed short-pulse for lower data rates;

FIG. 5 depicts an example of implementation of a decoding receiver;

FIG. 6 depicts schematically the signals involved in FIG. 5; and

Figure 7:
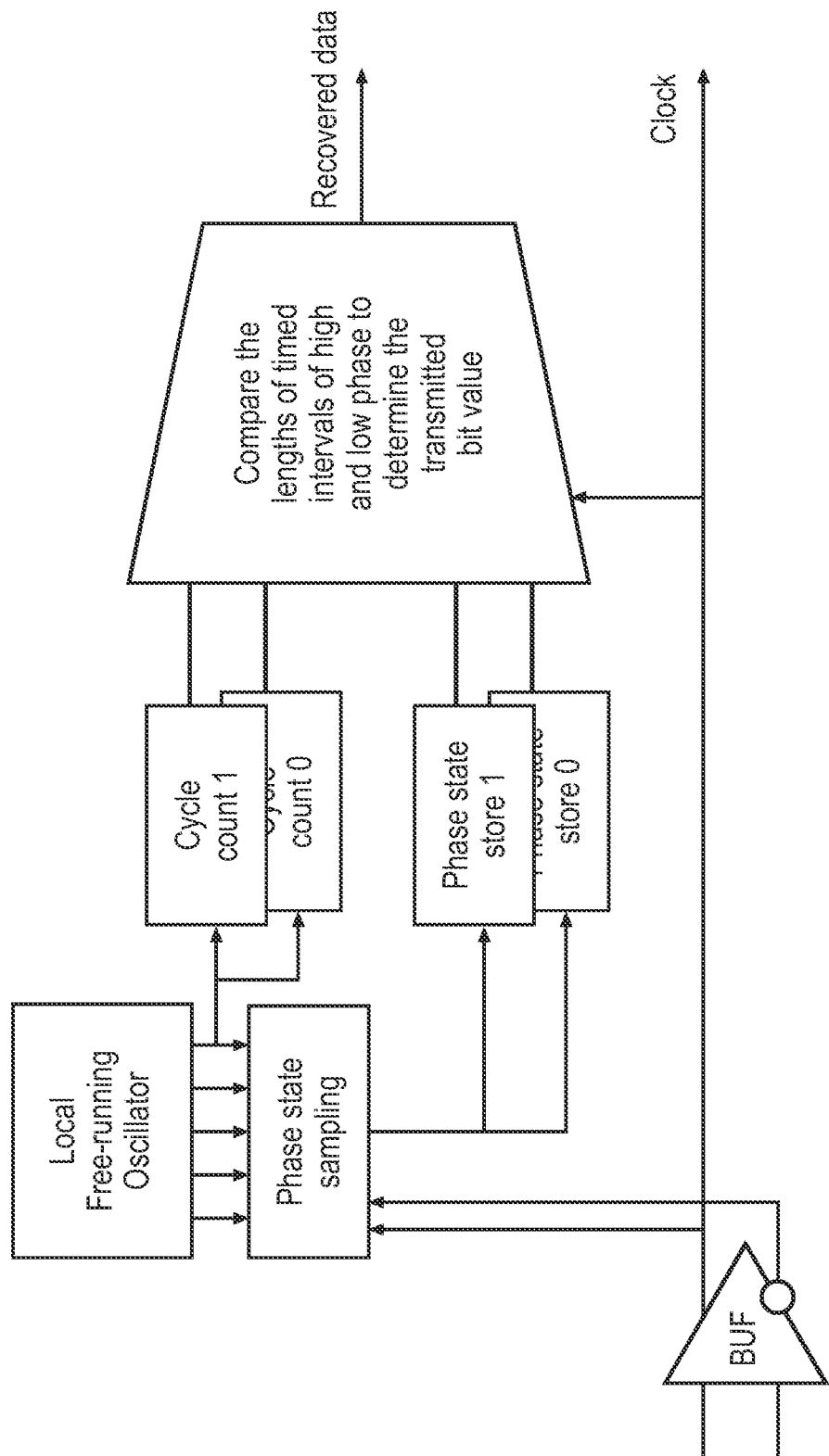

FIG. 7 depicts another example of a receiver.

One particularly interesting method, i.e. particularly advantageous embodiment of the invention, is to use a fixed time length for the short-fraction of the bit period for data rates below a certain limit rate, while maintaining to use a fixed fraction of the period above that limit data rate, which means a scaling time duration (one example of an implementation of this is illustrated schematically in FIGS. 3a-c).

This corresponds with a fixed duty-cycle at higher rate and an increasing duty cycle ratio for decreasing data rates below the limit rate. If now, for example, the fixed time duration requirements match with the requirements of the short-fraction of the lowest range with the fixed duty-cycle, a smooth cross-over is obtained (as illustrated schematically in FIG. 4a).

In practical systems the minimum allowable pulse width might be determined by interconnect length, due to reflections. For example in case of M-PHY the intended maximum interconnect length exceeds 1 meter with a signal flight time of several nanoseconds. This determines the base rate, which is the rate that is always supported under the specified system conditions. In case of M-PHY, this means the base rate must be below 20 Mb/s. As it is attractive to generate the DCM signals from the system clock which spans a significant frequency range (e.g. 19.2-52 MHz) so there are good reasons to allow a wide range of base rates, for example 6-18 Mb/s covering all these reference clock rates divided by 3, or alternatively 3-9 Mb/s covering all reference clock rates divided by 6.

In this case it is attractive to define the crossover point at this base rate: anything including and beyond the base rate uses fixed duty cycle DCM. For any rate below the base range, the constraints of the base range for the short-fraction of the bit period are taken, while the long fraction fills up the rest of the period.

The fixed length short period can be extended to any data rate down to 0 Hz, without any sub-ranging problem. This is because in the DCM signaling, the ratio of polarity length within a bit contains the information and consecutive bits can be of different lengths as long as they are in the same sub-range, so without a need for bias changes.

Aspects of the present invention now also allow 'pausing' the DCM transmission without the need for inserting of idle patterns. This 'pausing' can be achieved by keeping the lane state for any amount of time during the long fraction of a bit period. This really allows stopping activity on the lane and inside the PHY. This enables power reduction. Depending on which bit value is actually transmitted at the moment of pausing, this extended state may happen during a '0' or '1' lane state.

In certain systems that might be limitation on the duration of certain lane for other reasons that the DCM signaling itself. For example in MIPI M-PHY a long duration of one of the two lane states is interpreted as Reset. Of course it needs to be avoided that pausing DCM transmission is accidentally interpreted as a Reset event. Therefore, if the '1' state is used for Reset, it is best to pause the DCM transmission only during the bits for which the long period is '0'. Or the other way around, if the '0' state is used for Reset, it is best to pause the DCM transmission only during the bits for which the long period is '1'. Due to the long length limit for M-PHY, shorter pauses than the reset-limit are technically possible in any polarity.

The need to pause the communication for longer period will mostly exist between packets, while there might be reasons to insert small pauses during packets (e.g. if the data is not available in time) This combination is easily possible. The short pauses can be any polarity, so therefore during any bit inside the packet. Pausing between packet can be assured to happen on a lane state opposite to the Reset signaling, by making a proper choice for the packet delimiter sequence or it parameter field. If necessary additionally an end-of-packet delimiter sequence can be used to make sure that inter-packet-pausing always happens in the desirable lane state.

Further details of a duty-cycle modulation (DCM) bit-signalling with which embodiments of the present invention can be implemented will now be given, with reference to FIGS. 1 and 5-7. Further background information is given in WO 2008/114205, which is incorporated herein by reference. In these embodiments, implementation is as described below and also in WO 2008/114205, except that the duty-cycle ratio is adapted to a transmission rate as will be described in more detail later below with reference to FIGS. 3a-c and 4a-b.

Figure 1:
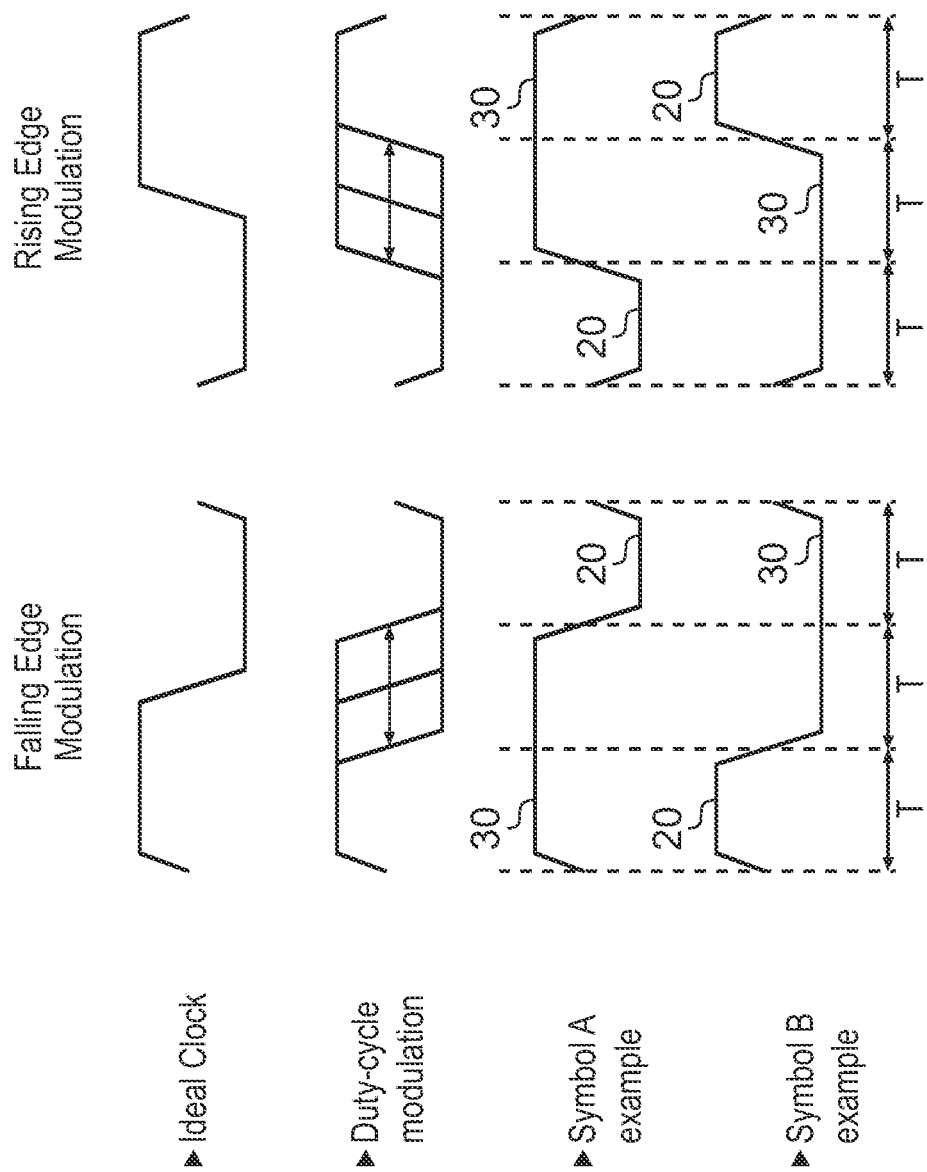
FIG. 1 is a schematic illustration of a duty cycle modulated binary transmission.
Figure 2:
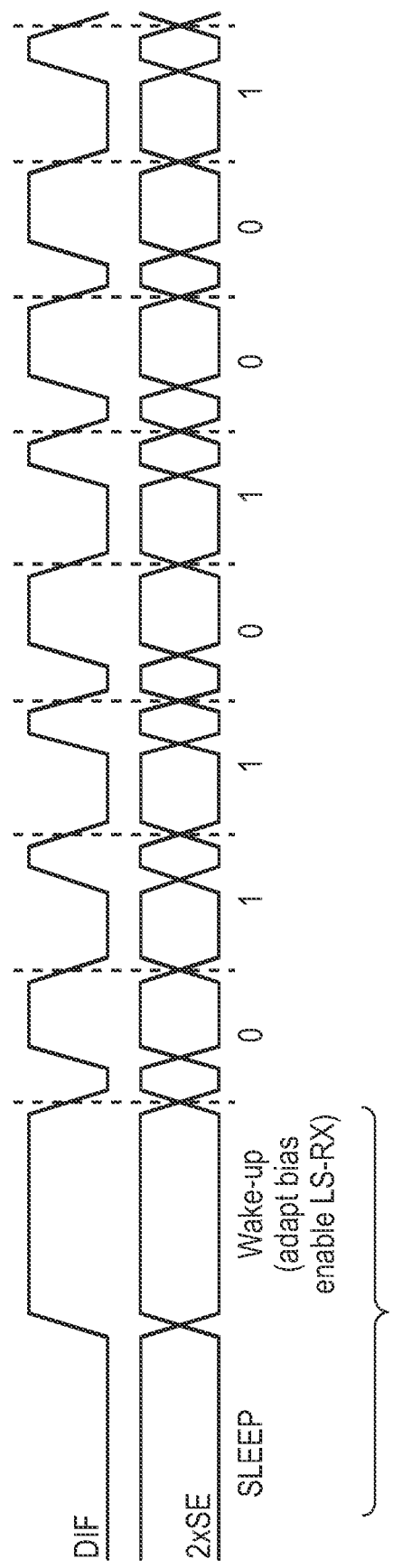
FIG. 2 depicts an example of DCM transmission.

A simple and therefore attractive possibility is to communicate one bit per symbol, as shown in FIG. 1, where each clock period is either 'longer-high-than-low' or 'shorter-high-than-low'. This can for example be implemented with 3T symbols i.e. having an arbitrary length T where one binary value is represented by symbol A: HHL and the other binary value is represented by symbol B: HLL. In this case the rising edge has a 'fixed' position, while the falling edge is modulated. In a given bit period (3T in the FIG. 1 example) there is one short phase 20 and one long phase 30. In the example of FIG. 1 the duty-cycle between the long phase and the short phase is 2:1.

Alternatively, the symbols can be LLH and LHH respectively, which implies modulation of the rising edge and a 'fixed' positioned falling edge. See also the symbols table in the attached coding slide set. It is a free choice to the designer of the system, which symbol represents which binary value ('0' or '1'). For differential signals one line must be defined as positive (normal) and the other as negative (inverse), because otherwise 'high' and 'low' would have no meaning due to the symmetrical nature of a differential signal.

Besides on differential interconnect, this coding scheme can also be exploited on single-ended interconnect structures, like for example stripline or coaxial cable. In this case the rising-edge modulated and falling-edge modulated version really represent two physically distinct alternatives.

Furthermore the coding can also be applied on optical interconnect, where 'high' and 'low' can for example be realized by means of optical power modulation. In most cases optical interconnect will utilize single-ended optical signaling. However, it is also possible to apply this coding technique in case of differential optical signaling.

Although the 3T period is useful to understand the concept, it incorrectly suggests a very tight correlation with a fixed rate clock, while this is not necessary. For binary data transmission the only condition is that for each symbol e.g clock period, the high-phase is distinguishable longer than the low-phase or the other way around.

Just the comparison of duration of high and low sub-phases within each symbol will provide the communicated bit value. Therefore, instead of a 33⅓-66⅔% modulation, any other modulation depth can be used as long as it is distinguishable at the receiver side.

As a matter of fact a deeper modulation makes it easier to recover the data, as long as the receiver is capable to process the shorter pulses properly.

Because the communicated data value is based on high/low interval ratios rather than signal amplitude values or absolute time duration, the invented coding scheme provides pseudo-asynchronous operation. Therefore each symbol (and therefore each clock period) can have a different duration, as long as the duty-cycle is properly modulated.

FIG. 5 depicts an example of implementation of a decoding receiver for this coding using falling edge modulation. The input signal is buffered in order to drive switches, flip-flops and a comparator. The buffered input signal can also be used as clock signal. The input polarity determines whether an integration capacitor is charged or discharged. If the capacitor is charged and discharged with almost the same current the polarity of the voltage at the end of the symbol provides the information which bit has been received. At the end of a symbol the capacitor voltage is compared with a reference voltage by means of amplifier-comparator and a flip-flop, which together represent a clocked-comparator function i.e. a sample and compare function. After this comparison and decision, the capacitor value is reset to the reference voltage, where is stays for a symbol time. Meanwhile the next symbol is 'integrated' on an equivalent second capacitor, which has been reset during the previous symbol. A 2-divider (toggling flip-flop) provides the control signal to swap the two integration capacitors interleaved between integrate and reset state. This interleaving architecture ensures that the timing becomes much less critical.

FIG. 6 depicts schematically the signals involved in FIG. 5.

Alternatively, FIG. 7 depicts another example of a receiver. In this example, the length of the high and low phases by using a free-running oscillator and timers/counters are compared. The time resolution can be enhance by keeping the phase state of the oscillator. In fact this is a time-to-digital converter, which convert both the high and low sub-phase periods to a digital value. At the end of each symbol, it is determined which sub-phase lasted longer by comparing the digital representations for the sub-phases.

Any possible implementation of a time-to-digital converter can be used for this kind of receiver architecture. This also includes fully delay-line bases solutions, which determine which edge, rising or falling, ripples further through the delay-line before the opposite edge appears.

Further details of an embodiment in which the duty-cycle ratio is adapted to a transmission rate as will now be described with reference to FIGS. 3a-c and 4a-b.

FIGS. 3a-c show in combination different duty-cycle ratios at different transmission rates. A bit period comprises a short phase 20 and a long phase 30. The duty-cycle ratio is that between the duration of the long phase 30 and the duration of the short phase 20. In particular, FIG. 3a shows the duty-cycle ratio for when the transmission rate is at the base rate, FIG. 3b shows the duty-cycle ratio for when the transmission rate is higher than the base rate, and FIG. 3c shows the duty-cycle ratio for when the transmission rate is lower than the base rate. In FIGS. 3a and 3b, i.e. when the transmission rate is at the base rate or higher than the bit rate, the duty-cycle ratio is a fixed fraction of the clock bit rate. In FIGS. 3a and 3b, bits are 3T long, and the short fraction of bit period is T and the long fraction of bit period is 2T (i.e. in FIGS. 3a and 3b the short phase is a set fraction, namely ⅓ of the whole bit period, or alternatively expressed, ½ of the length of the long period). However, in FIG. 3c, i.e. when the transmission rate is lower than the bit rate, the duty-cycle ratio is instead defined in terms of a fixed length (T) for the short phase, where the bits are now longer than 3T. Thus in this embodiment, for transmission rates at the base rate and higher than the base rate, a fixed fraction duty cycle is implemented, whereas for transmission rates lower than the base rate, a fixed length short phase ("fixed-pulse") is implemented FIGS. 4a-b depict a diagram schematically showing fixed length versus fixed fraction. In FIGS. 4a-b, the following reference numerals represent the following information:

Reference numeral 2—Transition range from fixed-ratio to fixed pulse: Fixed-pulse shall not violate minimum duty cycle ratio, but can violate maximum duty cycle ratio with respect to fixed-ratio.

Reference numeral 4—Base-range (and higher): time tolerance relative to momentary bit period.

Reference numeral 6—Optional higher speed ranges.

Reference numeral 8—Decreasing absolute timing tolerance for increasing bit rates.

Reference numeral 10—Larger tolerances possible for "fixed-pulse" lower bit rates.

FIG. 4a schematically illustrates how a smooth cross-over may be obtained, as follows.

The DCM signaling can be either fixed-ratio (i.e. fixed fraction) or fixed-pulse (i.e. fixed length), where for fixed-ratio the duty cycle of the period is set, while for fixed-pulse the absolute length of the shortest fraction of the bit-period is given. The fixed-ratio is most suitable for medium to high transmission rates in order to avoid that the short pulses become too short to recognize them. This limits the higher harmonics of the spectrum of the signal and requires less interconnect bandwidth compared to very short pulses associated with high bit rates and higher duty cycle ratios. Simultaneously the duty cycle should not become to close to 50/50 in order to make the transmitted bit values distinguishable.

The fixed-pulse is most suitable for lower transmission rates as the short-pulse length is not critical there, while it eases reception if not both short and long fraction of the bit period can become very long. If an integrating demodulator is applied, clipping the integration of the long phase is acceptable as long as the short pulse can be accurately measured.

Somewhere in the middle range of transmission rate these two DCM transmission signaling formats change from one to the other. A preferred implementation for that is to ensure that the minimum duty cycle ratio for the fixed-ratio range (e.g. 40/60) is fulfilled for all signaling rates, including the fixed-pulse part. The fixed-pulse part violates the maximum duty-cycle ratio of the fixed-ratio range (e.g. 25/75).

Therefore the minimum pulse length for the fixed-pulse range matches the pulse corresponding to the maximum duty-cycle (e.g. 25%) for the lowest transmission rate with the fixed-ratio signaling.

Similarly, the maximum pulse length for the fixed-pulse range could be matched to the pulse corresponding to the minimum duty-cycle (e.g. 40%) for the lowest transmission rate with the fixed-ratio signaling. However this would unnecessarily set a low tolerance for the duration of the short phase for the lower transmission rates.

Therefore this embodiment additionally increases the maximum pulse length for the fixed-pulse range. In order to fulfill the minimum duty-cycle for all ranges, the max pulse length for rates close to the lowest transmission rate for fixed-ratio signaling, is an extrapolation of the upper limit for the fixed-ratio ranges. The maximum short-pulse length must stay below an absolute maximum time for rates below the crossover points where the extrapolated part hits the absolute maximum.

Another possibility is shown in FIG. 4b. The transition range can be made part of the base range, such that for all rates below the base rate only the absolute duration of the short fraction matters.

In certain of the above embodiments the duty-cycle ratio is adapted to the transmission rate in terms of discrete changes according to ranges of the transmission rate. However, this need not be the case, and in other embodiments the duty-cycle ratio is adapted to the transmission rate without consideration of ranges of the transmission rate. For example, a fixed length for the short period may be employed for all transmission rates. Another possibility, for example, is that the duty-cycle ratio may be varied continuously as a function of transmission rate.

In certain of the above embodiments a differential version of DCM signalling is applied. However, this need not be the case, and in other embodiments other ways of applying this signalling concept are employed. One possibility, for example, is employing single-ended signalling.

The invention claimed is:

1. A duty-cycle modulated bit signaling method, comprising:
    signaling bits from a transmitter by virtue of a duty-cycle ratio, wherein the duty-cycle ratio is defined by the ratio between a short phase and a long phase in a bit period, the bits being signaled at a transmission rate, wherein the bit period is the length of time to transmit a binary digit and wherein the short phase and the long phase in a bit period correspond to high and low signal phases, respectively, of a bit signal or to low and high signal phases, respectively, of a bit signal;
    wherein the duty-cycle ratio is varied by the transmitter dependent upon a transmission rate of the signaling;
    wherein in a first transmission rate range, the duty-cycle ratio is maintained at a fixed ratio between the short phase and the long phase in a bit period over the transmission rates in the first transmission rate range and in a second transmission rate range, the short phase of the bit period is maintained at a fixed length while the length of the long phase changes with changes in the transmission rate over the second transmission rate range, wherein the transmission rates in the first transmission rate range are higher than the transmission rates in the second transmission rate range.

2. A method according to claim 1, wherein a bit period comprises a short phase and a long phase and the duty-cycle between the long phase and the short phase is varied such that the ratio between the duration of the long phase and the duration of the short phase is increased for decreasing transmission rate.

3. A method according to claim 1, wherein the duty-cycle ratio is varied dependent upon the transmission rate of the signaling according to at least one range of transmission rate.

4. A method according to claim 1, further comprising a lower bound for a duration of the short phase in the at least one lower transmission rate range.

5. A method according to claim 1 wherein a cross-over of the higher transmission rate range and the lower transmission rate range is positioned at a base rate.

6. A method according to claim 1, further comprising pausing the transmission by fixing a line state during a long fraction of any bit.

7. A method according to claim 1, further comprising choosing a lane state during pausing.

8. A method according to claim 1, further comprising pausing the transmission by fixing a lane state during a long fraction of a '1' bit.

9. A method according to claim 1, further comprising pausing the transmission by fixing a lane state during a long fraction of a '0' bit.

10. A method according to claim 1, further comprising ensuring that for long pauses a lane state during the pauses is always '0'.

11. A method according to claim 1, further comprising ensuring that for long pauses a lane state during the pauses is always '1'.

12. A method according to claim 1, further comprising ensuring that for inter-packet pauses a lane state during the pauses is always '0'.

13. A method according to claim 1, further comprising ensuring that for inter-packet pauses a lane state during the pauses is always '1'.

14. A duty-cycle modulated bit signaling method, comprising:
   signaling bits from a transmitter by virtue of duty-cycle modulation (DCM), wherein the ratio between a short phase and a long phase in a bit period defines a duty cycle ratio, the bits being signaled at a transmission rate, wherein the bit period is the length of time to transmit a binary digit and wherein the short phase and the long phase in a bit period correspond to high and low signal phases, respectively, of a bit signal or to low and high signal phases, respectively, of a bit signal; and
   varying the duty-cycle ratio in response to the transmission rate;
   wherein in a first transmission rate range, the duty-cycle ratio is maintained at a fixed ratio between the short phase and the long phase in a bit period over the transmission rates in the first transmission rate range and in a second transmission rate range, the short phase of the bit period is maintained at a fixed length while the length of the long phase changes with changes in the transmission rate over the second transmission rate range, wherein the transmission rates in the first transmission rate range are higher than the transmission rates in the second transmission rate range.

15. The method according to claim 14 further comprising, defining a lower bound for the fixed length of the short phase in the at least one lower transmission rate range.

16. The method according to claim 15 wherein a cross-over of the higher transmission rate range and the lower transmission rate range is positioned at a base rate.

17. A duty-cycle modulated bit signaling method, comprising:
   signaling bits from a transmitter by virtue of a duty-cycle ratio, wherein the ratio between a short phase and a long phase in a bit period defines a duty cycle ratio, the bits being signaled at a transmission rate, wherein the bit period is the length of time to transmit a binary digit and wherein the short phase and the long phase in a bit period correspond to high and low signal phases, respectively, of a bit signal or to low and high signal phases, respectively, of a bit signal;
   wherein the duty-cycle ratio is varied by the transmitter dependent upon a transmission rate of the signaling;
   wherein the duty-cycle ratio is varied dependent upon the transmission rate of the signaling according to at least one range of transmission rate;
   wherein in at least one higher transmission rate range the duty-cycle is defined as a fixed ratio, and in at least one lower transmission rate range the duty-cycle is defined by a fixed length of the short phase of the bit period; and
   wherein a cross-over of the higher transmission rate range and the lower transmission rate range is positioned at a base rate such.

* * * * *